United States Patent
Schad

[11] Patent Number: 5,522,720
[45] Date of Patent: Jun. 4, 1996

[54] INJECTOR NOZZLE WITH PIVOTALLY MOVABLE SURFACES

[75] Inventor: Robert D. Schad, Toronto, Canada

[73] Assignee: Husky Injection Molding Systems Ltd., Bolton, Canada

[21] Appl. No.: 327,561

[22] Filed: Oct. 24, 1994

[51] Int. Cl.$^6$ ................................................. B29C 45/22
[52] U.S. Cl. .................. 425/567; 264/297.2; 264/328.8; 425/569; 425/570; 425/572; 425/588
[58] Field of Search ...................... 425/567, 568, 425/569, 570, 571, 572, 574, 588; 264/297.2, 328.8

[56] References Cited

U.S. PATENT DOCUMENTS

| | | | |
|---|---|---|---|
| 3,568,256 | 3/1971 | Johnson, Jr. ................. | 425/570 |
| 5,229,145 | 7/1993 | Brown et al. ................. | 425/588 |
| 5,370,523 | 12/1994 | Kushnir ....................... | 425/568 |

*Primary Examiner*—Tim Heitbrink
*Attorney, Agent, or Firm*—Bachman & LaPointe

[57] ABSTRACT

A nozzle for directing molding material from a material source to a sprue, includes a first surface adapted to connect the nozzle to the material source. The first surface is also adapted to be adjacent to and pivotally movable relative to the material source and in material communication with the material source. A second surface is adapted to be positioned adjacent to and pivotally movable relative to the sprue. The second surface is in material flow communication with the first surface and adapted to be in material flow communication with the sprue. A channel is included for establishing the material flow communication through the nozzle.

26 Claims, 7 Drawing Sheets

INJECTOR NOZZLE WITH PIVOTALLY MOVABLE SURFACES

BACKGROUND OF THE INVENTION

This invention relates to injection molding machines using sprues, and more particularly, to a nozzle for use with a sprue which is capable of tolerating positioning error of the sprue while still forming a good seal therewith.

For injection molding applications where there are more than 2 levels in the mold, multiple sprue bars can be used for delivering a split resin stream to the multi-level injection mold. That is, after the resin stream is split, the sprue bars carry the resin to the mold sections comprising the injection mold. With multi-level sprue bar applications, typically a single source channel is used with a nozzle which breaks the single source channel into a plurality of channels aligned with the individual sprue bars. Typically, the sprue bars are attached with the mold section to which the molding resin is being delivered. Because injection molding devices generally move in the longitudinal or vertical direction, the sprue bars must be displaced with the platens. Accordingly, the sprue bars are not rigidly attached to the nozzle or in the channel from which the molding material is received and as such, the sprue bar arrangement must be designed so that the sprue bars will return to the channel splitting nozzle and reform a seal therewith.

In particular, for multi-level stack molds where resin must flow from a single source injection unit to multiple levels spaced progressively farther from the stationery platen, several design problems are typical. For example, in a four level stack mold, a sprue bar will feed the first and second level via channels in the mold plate between the two levels and another sprue bar will feed the third and fourth levels via channels in the mold plate between these two levels. Because of the progressive arrangement, these two sprue bars will necessarily be of different lengths. Additional variations in length occur due to each sprue bar being subject to thermal expansion effects. Accordingly, when the mold is closed, the position of the end of each sprue bar relative to the stationery platen and the channel splitting nozzle and the other sprue bar, will vary due to variations in the position in which the mold plates close between various levels. The combination of these variables makes it almost impossible to predict the location of the two sprue bar ends or bushings each time the mold is closed and the sprue bar is returned to the multiple channel nozzle.

The prior art contains several devices directed toward injection units having single source and multiple channel supplies and corresponding attempts to solve the problems of creating reliable and repeatable seals between the multi-channel nozzle and the sprue bars or similar channels.

U.S. Pat. No. 3,843,295 discloses an injection molding machine with adjustable nozzle length means. The machine comprises a plurality of split molds mounted upon a plurality of platens having parallel faces which reciprocate linearly for the opening and closing of the molds. Each mold cavity is filled through one or more nozzles extending from a fixed manifold portion of the machine. Each nozzle has a tip at least intermittently fitting against a nozzle seat. Length adjustment means are provided for each nozzle. The molding machine is operable at a plurality of temperatures, while still having a reciprocatingly retractable leakproof fit between certain nozzle tips and their nozzle seats. The spring based nozzle in FIG. 4 can accommodate a varying seating location wherein the resulting sealing force will vary according to the spring compression. However, this results in inconsistent performance. FIG. 5 of the same patent shows a hydraulically actuated nozzle which also accommodates variation while maintaining a consistent sealing force. However, the use of hydraulic fluid in close proximity to hot resin is very dangerous since the fluid is flammable and the complexity of the fluid supply conduits increases costs and maintenance.

U.S. Pat. No. 3,915,610 discloses an alignment assembly for plastic injection molds. The alignment assembly includes a base communicating with a respective cavity and counterbore. A valve body is provided which has a stem portion slidably and sealingly disposed in the bore and a head portion disposed in the counterbore. The body has a through portion and the head portion is configured to mate with an ejection nozzle. The sealing fit of the stem allows axial movement of the body to react to the pressure generated in the cavity by the injected plastic and thereby be forced tightly against the nozzle to prevent flash. The apparatus disclosed relies upon the pressure of the plastic pushing the body 32 against the nozzle to maintain the seal between the nozzle and the body. The seal on the stem is created by a tangential contact between the stem and bore. The device requires that the stem pivot and slide in the bore to create and maintain alignment. This will result in wear on the spherical portion which will lead to clearance and eventually leakage. Also, since the contact area is so small, there is little capacity to tolerate wear.

U.S. Pat. No. 4,299,791 discloses a method for preventing the drooling of a plastic injection molds and injection nozzles. The patent discloses a spring biased sprue member used to accommodate a change in resin volume following injection. The device deals with only one nozzle/sprue connection and the spring design does not serve to accommodate varying locations of nozzles through contact.

U.S. Pat. No. 4,917,595 discloses a nozzle touch sprue bushing device. The device is for use with a unit-type injection metal mold which includes a molding body having an inner mold element which is removably mounted on an outer frame of an injection molding machine. The sprue bush has a nozzle touch provided at a rear end thereof for fitting with an end of a nozzle of an injecting machine. The sprue bush also has a front end formed in such a fitting configuration so as to allow fitting engagement with a material admitting portion of the mold. All of the methods disclosed in this patent include spring means used to bias the intermediate conductor away from the inner mold inlet until the nozzle is engaged. The sprue bush is spring biased and substantially rigidly attached and does not allow for angular misalignments of the injection nozzle or the plate bush.

There exists a need, therefore, for a nozzle for use with a sprue which is return position error tolerant and which allows the formation of a tight reliable repeatable seal between the sprue and the nozzle.

SUMMARY OF THE INVENTION

The primary object of this invention is to provide an injector nozzle for use with a sprue or plurality of sprues which distributes a sealing force in a desired manner along the sprue or a plurality of sprues and is position error tolerant.

Another object of this invention is to provide an injector nozzle for use with at least one sprue which does not require precision manufacturing yet still tolerates substantial misalignment.

Still another object of this invention is to provide an injector nozzle for use with at least one sprue which requires no modifications to the existing injection molding machines for using the nozzle.

Yet another object of this invention is to provide an injector nozzle for use with multiple sprue bars which is tolerant of wear of mating spherical surfaces.

And still another object of the this invention is to provide an injector nozzle for use with multiple sprue bars which can be used in stacked formations to service injection molding machines having almost any number of channels.

And yet another object of this invention is to provide an injector nozzle for use with multiple sprue bars having a simple mechanical operation for insuring equal force distribution to multiple sprue bar arrangements while also assuring uniform sealing forces.

The foregoing objects are attained by the nozzle of the present invention which includes a first surface including means for connecting the nozzle to the material source. The first surface is adapted to be adjacent to and pivotally movable relative to the material source and in material communication with the material source. A second surface is adapted to be positioned adjacent to and pivotally movable relative to a sprue. The second surface is in material flow communication with the first surface and adapted to be in material flow communication with the sprue. A channel means is used for establishing the material flow communication through the nozzle.

In one embodiment, the means for connecting is comprised of an adapter adapted to be sealably connected to the material source. The adapter has an engaging surface in pivotal engagement with the first surface and the channel means passing therethrough. A seal is created between the engaging surface and the first surface.

The same embodiment may also include the first and second surfaces comprising sides of a first nozzle tip. The nozzle tip functions to direct the molding material from the adapter to a plurality of sprue bars wherein the second surface includes an area adapted to be pivotally and sealably engaged with the sprue bar.

The details of the present invention are set out in the following description and drawings wherein like reference characters depict like elements.

DETAILED DESCRIPTION OF THE PREFERRED EMBODIMENT

Figure 1:
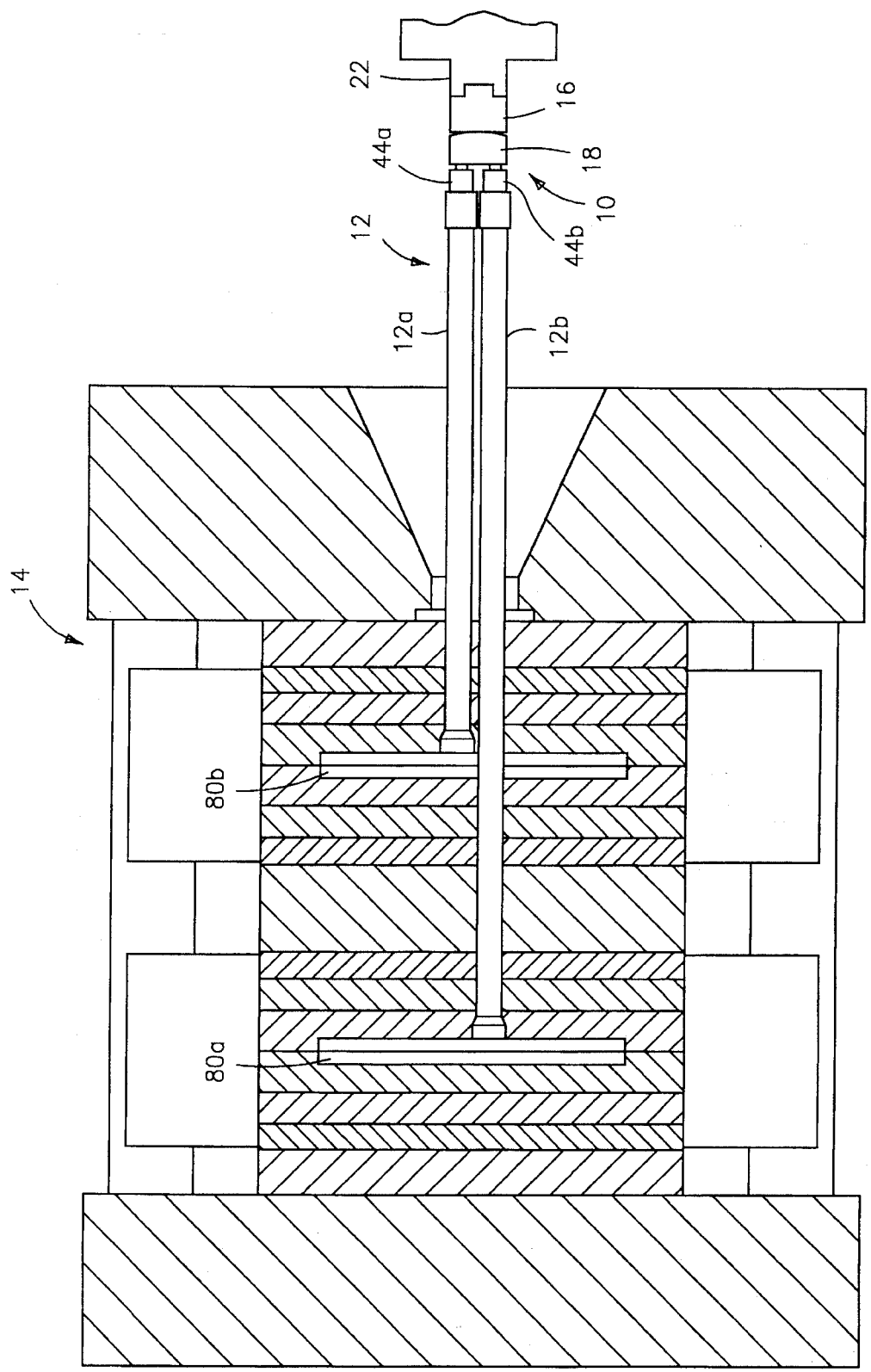
FIG. 1 is a top or plan view of a four level stack mold in the closed position with the sprue bars engaging the injector nozzle in accordance with the principles of the present invention.
Figure 2:
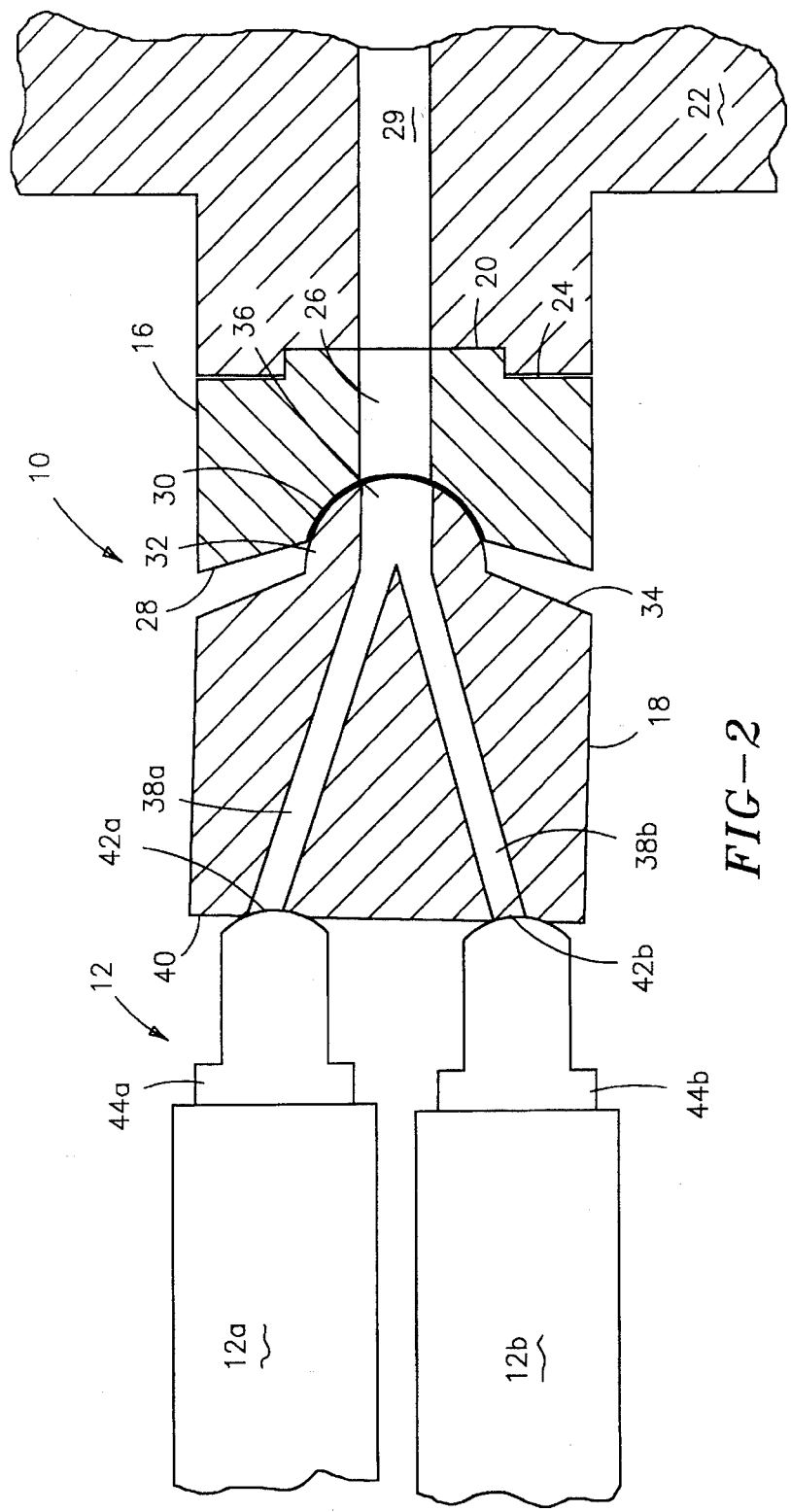
FIG. 2 is a top or plan and partial cross-sectional view of the nozzle of the present invention being used with two sprue bars.

Referring now to the drawings in detail, there is shown in FIG. 1 a top or plan view of the nozzle of the instant invention, designated generally as 10, being used with multiple sprue bar arrangement 12 in a stack injection mold 14. Referring to FIG. 2, injector nozzle 10 includes an adapter 16 and a nozzle tip 18.

Adapter 16 is used for connecting nozzle 10 to the discharge end 20 of a molding resin barrel 22. Side 24 of adapter 16 is specifically shaped to engage the barrel 22. The adapter is secured to the barrel 22 by bolts or other well known conventional means not shown for clarity. Adapter 16 also includes a channel 26 extending therethrough from side 24 to side 28. While being attached with barrel 22, channel 26 is adapted to be in alignment with an output port 29 of barrel 22 for discharging molding resin from barrel 22 through adapter 16 and into nozzle tip 18. Side 28 includes an area having a concave recess 30 substantially centered on side 28. Recess 30 engages a mating convex spherical extension 32 extending from side 34 of nozzle tip 18. Concave recess 30 is preferably hardened and polished so that it performs as a sealing surface and a sliding surface for the mating convex spherical extension 32 of nozzle tip 18. By being polished and hardened, friction with extension 32 is minimized.

Convex spherical extension 32 of nozzle tip 18 has a radius that matches concave recess 30 of adapter 16. However, the depth of extension 32 is greater than the depth of recess 30 so that clearance is provided for nozzle tip to pivot relative adapter 16. Side 34 at the locations extending outwardly from the base of extension 32 is substantially angled relative to surface 28 so as also to allow for pivotal movement of side 34 relative side 28. However, any configuration allowing pivoting can be used, such as e.g., cylindrical rather than spherical surfaces.

The surface of convex extension 32, similar to recess 30, is hardened and polished for establishing a sealing and sliding engagement with concave recess 30. Preferably, at the center of the surface of convex extension 32 is an inlet 36 in alignment with channel 26 of adapter 16. Inlet 36 extends slightly into the depth of extension 32 and diverges into two channels 38a and 38b. Channels 38a and 38b extend through the entire depth of nozzle tip 18 in a diverging manner and open into side 40 of nozzle tip 18.

Figure 3:
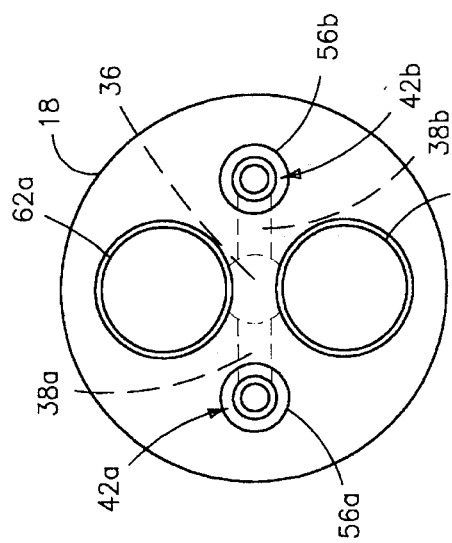
FIG. 3 is a front elevational view of the nozzle shown in FIG. 2.

As shown in FIGS. 2 and 3, channels 38a and 38b lead into two areas having concave recesses 42a and 42b formed into side 40. Recesses 42a and 42b are adapted to partially engage the convex ends of sprue bushings 44a and 44b, respectively, of sprue bars 12a and 12b, respectively, as shown in FIG. 2. The surfaces of concave recesses 42a and 42b are also hardened and polished for establishing a sealed and sliding relationship with sprue bar bushings 44a and 44b (see FIG. 2), respectively. Accordingly, channels 38a and 38b are adapted to be in fluid communication with sprue bars 12a and 12b, respectively, for the flow of molding resin from barrel 22 into adapter 16 through nozzle tip 18 and into the sprue bars 12a and 12b.

Figure 2A:
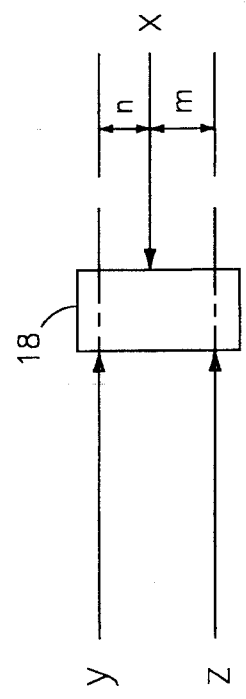
FIG. 2a is a schematic diagram of the force distribution associated with the nozzle, sprue bars, and injection molder.

FIG. 2a illustrates how the force exerted by the injection unit or carriage (not shown) is distributed on the nozzle tip of the present invention. In all cases, the sum of forces Y and Z, respectively, from sprue bars 12a and 12b, is equal to force X of the injection unit (not shown). If the lateral distances of sprue bars 12a and 12b, N and M, respectively, of forces Y and Z, respectively, from the point of application of force X are substantially equal, than forces Y and Z will be substantially equal and one half of X. Obviously, if one of the distances is zero then the corresponding force will be equal to the force X since force X is acting directly on only one of the sprue bars. Also, if distance N is twice the value of distance M then force Z corresponding to M will be twice that of force Y. This feature is important in that the force acting on each of the two sprue bars 12a and 12b (see FIG. 2) can be tailored to specific design needs. The force exerted by the carriage is all that is needed to effectively create the necessary seal between the mating surfaces.

Figure 4:
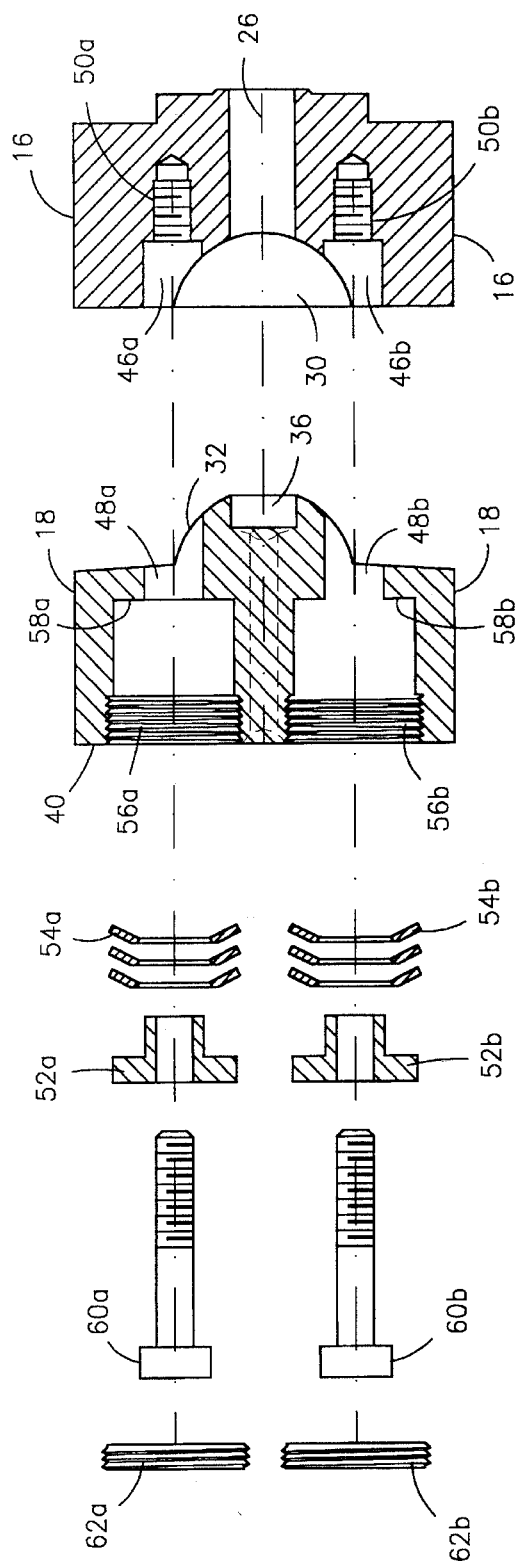
FIG. 4 is an exploded assembly view of the nozzle shown in FIG. 2.

Referring now to the exploded view of FIG. 4, adapter 16 includes bolt holes (not shown) for mounting to barrel 22 (see FIG. 1) of the injection unit extruder (not shown). Convex extension 32 of nozzle tip 18 is inserted into concave recess 30 of adapter 16. Nozzle tip 18 includes two bores 48a and 48b aligned with respective bores 46a and 46b and threaded holes 50a and 50b, respectively, of adapter 16 for connecting adapter 16 and nozzle tip 18. Flanged sleeves 52a and 52b are inserted into Bellville washers 54a and 54b, respectively, wherein the sleeve and washer assembly is inserted into each of bores 56a and 56b, positioned in side 40 of nozzle tip 18 and which lead into bores 48a and 48b, respectively, such that the large diameters of the Bellville washers 54a and 54b rest on faces 58a and 58b, respectively, of bores 56a and 56b. Bolts 60a and 60b are then inserted through sleeves 52a and 52b, respectively, and screwed into the threaded bores 50a and 50b of adapter 18. The assembly described, forces together the mating spherical surfaces of recess 30 and extension 32 and maintains the surfaces in contact, while also maintaining adapter 16 and nozzle tip 18 in axial alignment prior to the contact of nozzle tip 18 with sprue bars 12a and 12b (shown in FIG. 1). Finally, caps 62a and 62b are screwed into threaded counter bores 56a and 56b for the purpose of preventing plastic from entering counter bores 56a and 56b and interfering with the spring operation of washers 54b and 54b.

During operation, and for all the embodiments discussed herein, Bellville washers 54, shown in FIG. 4, serve an important function of maintaining the nozzle tip in axial alignment with the adapters. After pivoting, the springs of the washers force the nozzle tip back to the axially aligned position shown in FIG. 2. Another function of the washers is to exert a force between the adapter and nozzle tip and keep the spherical surfaces of the extensions and recesses seated so there is no leakage at the interface when the nozzle tips are disengaged by the sprue bars.

Figure 5:
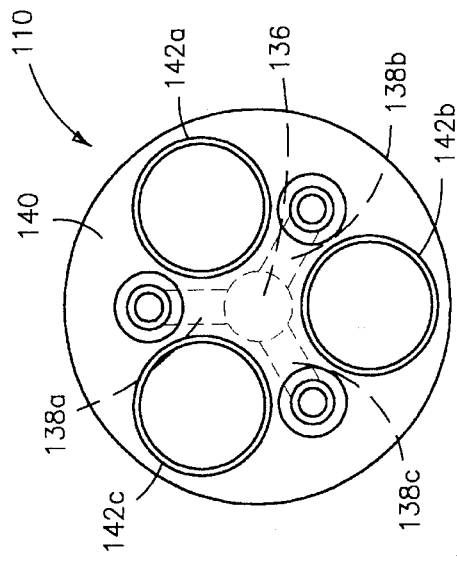
FIG. 5 is a front elevational view of a nozzle of the present invention showing an alternative embodiment for use with three sprue bars.

A front elevational view of a second embodiment of the nozzle of the present invention is shown in FIG. 5 as nozzle 110 and is adapted for use with three sprue bars. The assembly is essentially the same as shown in FIG. 2 for nozzle 10 except for the addition of a third concave recess 142c along with concave recesses 142a and 142b, for engaging three sprue bars (not shown). Regarding nozzle 110, recesses 142a, 142b and 142c are arranged in a triangular manner on surface 140. The assembly of nozzle 110 is the same as discussed above for nozzle 10 except that instead of using two bolt, sleeve and washer assemblies, three such assemblies are used and arranged in a triangular manner offset from the triangular arrangement of recesses 142a–142c. In addition, nozzle 110 includes three channels 138a, 138b and 138c which lead to an inlet 136 and a straight channel (not shown) of the adapter (not shown), similar to as described above. The nozzle tip of nozzle 110 engages the adapter as described above using mating concave and convex spherical surfaces.

Figure 6:
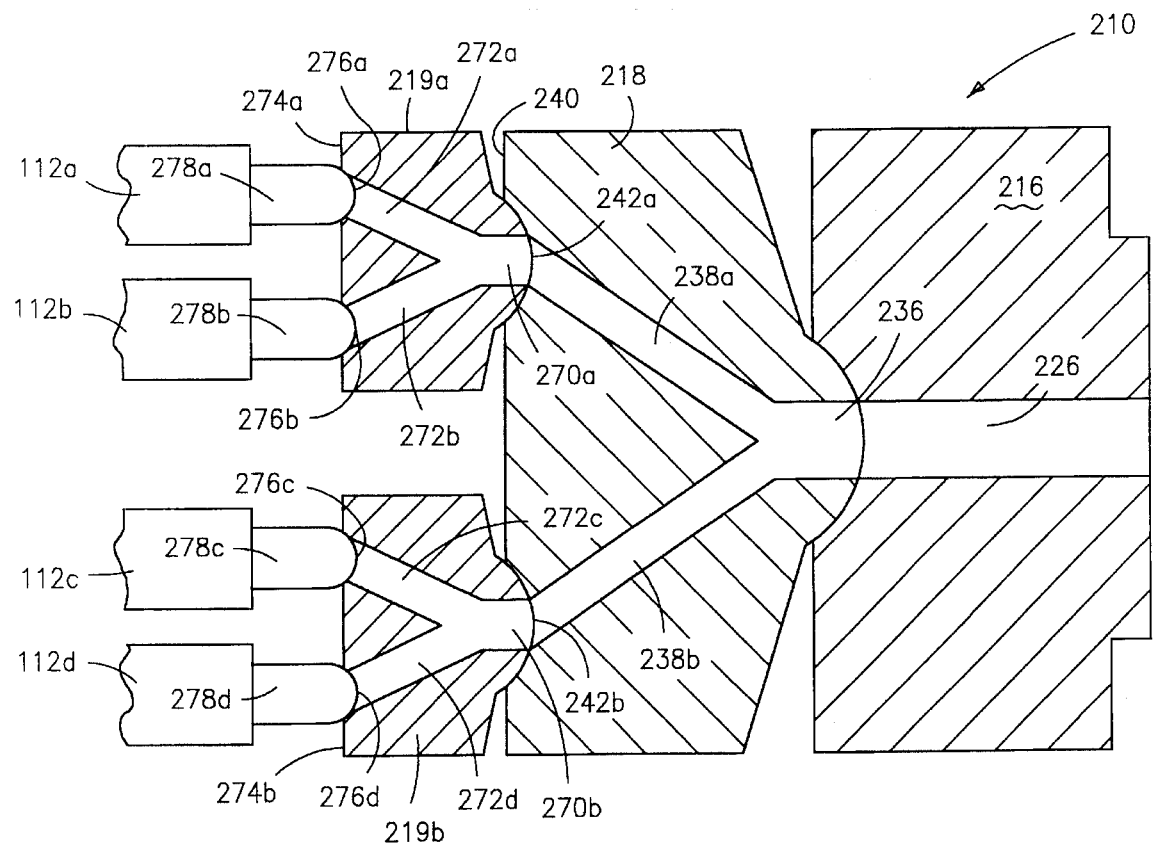
FIG. 6 shows another alternative embodiment of this invention for use with four sprue bars.
Figure 7:
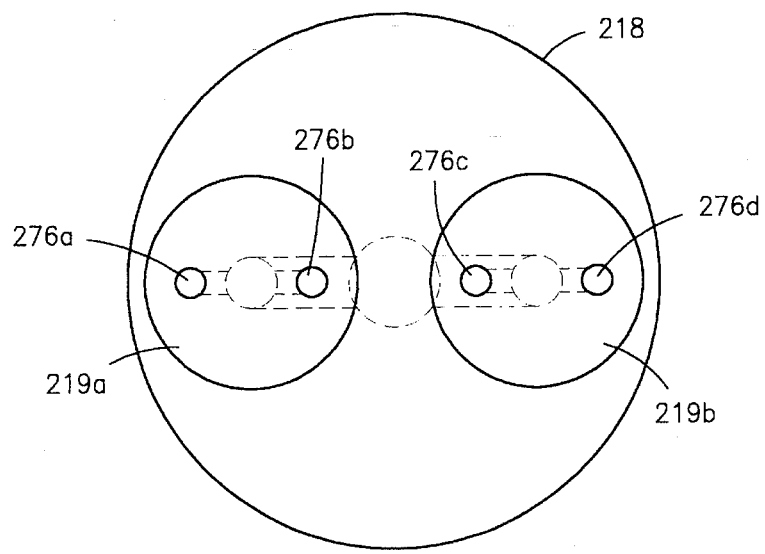
FIG. 7 shows a front elevational view of the embodiment of the nozzle shown in FIG. 6.

Nozzle 210, shown in FIGS. 6 and 7 is another alternative embodiment of the present invention. As shown in FIG. 6, nozzle 210 is adapted to be used with four sprue bars 112a–112d. Nozzle 210 includes an adapter 216, pivotal primary nozzle tip 218 and pivotal secondary nozzle tips 219a and 219b. With reference to adapter 216 and primary nozzle tip 218, these elements are similar to as described above for adapter 16 and nozzle tip 18, respectively. One difference in this embodiment, is that adapter 216 and primary nozzle tip 218 are larger in size and consequently, larger in surface area for receiving both of secondary nozzles 219a and 219b on surface 240 of primary nozzle tip 218. Accordingly, as described, channel 226 of adapter 216 leads into an inlet 236 of primary nozzle tip 218. Inlet 236 branches into two diverging channels 238a and 238b which open up into side 240 and are centered on concave recesses 242a and 242b.

Nozzle 210 differs from nozzle 10 via the use of a secondary nozzle tips 219a and 219b. Instead of concave recesses 242a and 242b engaging sprue bars, concave recesses 242a and 242b pivotally engage secondary nozzle tips 219a and 219b. Secondary nozzle tips 219a and 219b are simply smaller versions of primary nozzle tip 218, having the same overall design but smaller in size. Accordingly, secondary nozzle tips 219a and 219b include inlets 270a and 270b, respectively, in fluid communication with channels 238a and 238b, respectively, of primary nozzle tip 218. Inlets 270a and 270b, lead into diverging channels 272a and 272b and 272c and 272d, respectively, which diverge and extend through the body of secondary nozzle tips 219a and 219b, respectively, opening into sides 274a and 274b, respectively. Channels 272a and 272b, open into concave recesses 276a and 276b, respectively, which are adapted to engage sprue bars 112a and 112b and channels 272c and 272d open into concave recesses 276c and 276d, respectively, and are adapted to engage sprue bars 112c and 112d, respectively.

As with nozzle 10, all surfaces of concave recesses and convex extensions are polished and hardened so as to achieve a sealable and slidable engagements therebetween. Recesses 276a–276d are adapted to engage sprue bushings 278a–278d, respectively, wherein the spherical surfaces of the bushings and the recesses have matching radii. As a result of this arrangement, injection molders incorporating four sprue bars for the delivery of molten resin to molding surfaces can be accommodated. Misalignments and non-simultaneous return of sprue bars can be tolerated by the pivoting relationships between the convex and concave surfaces of nozzle 210. The force exerted by the carriage (not shown), as with the main embodiment, is all that is needed to effectively create the necessary seal between the mating surfaces.

Figure 8:
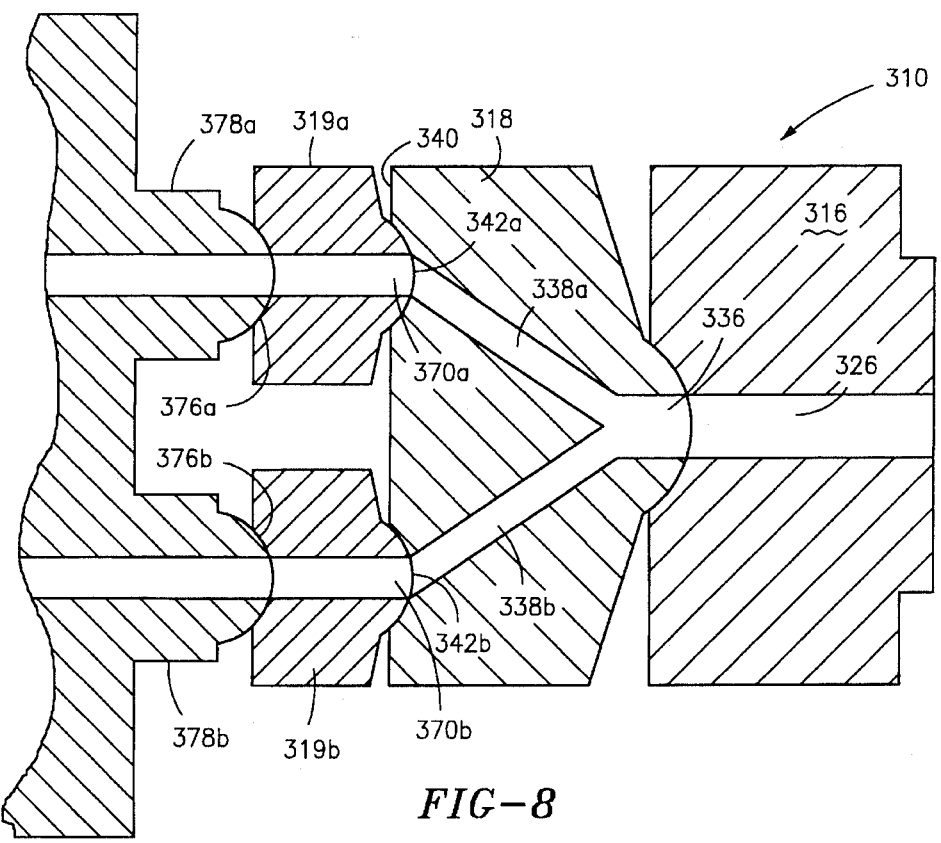
FIG. 8 is another alternative embodiment of the invention for use with multiple sprues.

Nozzle 310, shown in FIG. 8, is another alternative embodiment of the present invention and is very similar to nozzle 210 with the exception that it is directed for use in correcting axial alignment with nozzles and sprues. As shown in FIG. 8, nozzle 310 is adapted to be used with sprues 378a and 378b. Nozzle 310 includes an adapter 316, pivotal primary nozzle tip 318 and pivotal secondary nozzle tips 319a and 319b.

With reference to adapter 316 and primary nozzle tip 318, these elements are similar to as described above for adapter 16 and nozzle tip 18, respectively, including the spring loaded connections therebetween, as shown in FIG. 4. The spring loaded connections are not shown here for clarity. One difference in this embodiment, is that adapter 316 and primary nozzle tip 318 are preferably larger in size and consequently, larger in surface area for receiving both of secondary nozzles 319a and 319b on surface 340 of primary nozzle tip 318. Accordingly, as described, channel 326 of adapter 316 leads into an inlet 336 of primary nozzle tip 318. Inlet 336 branches into two diverging channels 338a and 338b which open up into side 340 and are centered on concave recesses 342a and 342b.

Nozzle 310 differs from nozzle 10 via the use of a secondary nozzle tips 319a and 319b. Instead of concave recesses 342a and 342b engaging sprue bars, concave recesses 342a and 342b pivotally engage secondary nozzle tips 319a and 319b. Secondary nozzle tips 319a and 319b are smaller versions of primary nozzle tip 318, having the same overall design with exception of the diverging channels. Accordingly, secondary nozzle tips 319a and 319b include channels 370a and 370b, respectively, in fluid communication with channels 338a and 338b, respectively, of primary nozzle tip 318. Channels 370a and 370b extend longitudinally straight through secondary nozzle tips 319a and 319b, respectively. Channels 370a and 370b, open into concave recesses 376a and 376b, respectively, which are adapted to engage sprue bushings 378a and 378b. As with nozzle 10 all surfaces of concave recesses and convex extensions are polished and hardened so as to achieve a sealable and slidable engagements therebetween. Recesses 376a and 376b are adapted to engage sprues 378a and 378b, respectively, wherein the spherical surfaces of the bushings and the recesses have matching radii. The force exerted by the carriage (not shown) is all that is needed to effectively create the necessary seal between the mating surfaces.

While the recesses and extensions have been described for the above embodiments as a part of the adapter and nozzle tips, respectively, an equivalently operative device can be achieved by including the extensions with the adapter and the recesses with the nozzle tip.

The application of the nozzle disclosed in this invention is not limited to simply two, three or four sprue bars. An apparatus can be designed and adapted to effectively engage any number of sprue bars, as required by the design of the injection mold. By the stacking of a plurality of nozzle tips on adapters, as shown for the nozzle 210 embodiment, and selecting the proper spacing between connection points, any number of sprue bars can be connected with the nozzles of the present invention, wherein each receives an individual sealing force. In addition, and in accordance with the following embodiment shown in FIG. 9, the nozzle of the instant invention can be used with only one sprue or sprue bar.

Figure 9:
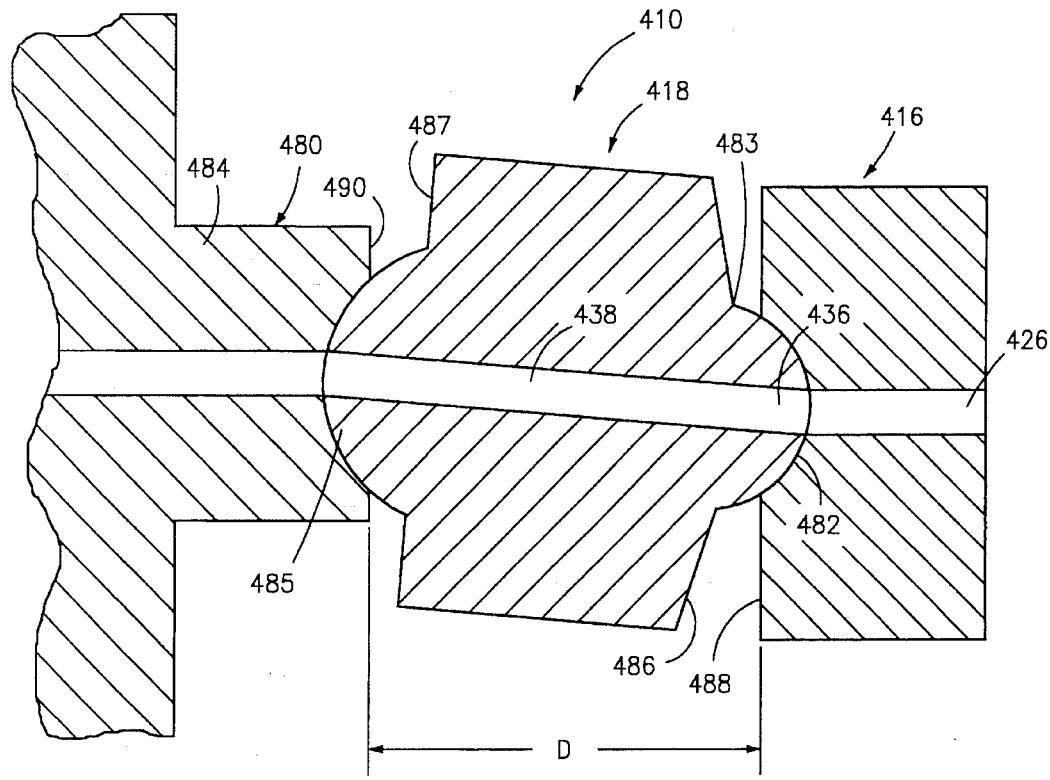
FIG. 9 is another alternative embodiment of the invention for use with a singular set of opposing channels.

FIG. 9 shows an embodiment of the present invention adapted to be used with only two channels, i.e, between a sprue and the adapter 410, wherein axial misalignment is compensated thereby but force equalization is not a feature. This embodiment includes an adapter 416, a nozzle tip 418, and a sprue 480. Nozzle tip 418 is connected to adapter 416 via the resilient spring loaded connections discussed for the main embodiment and shown in FIG. 4. Adapter 416 is substantially the same as that discussed above, having an inlet channel 426 and a substantially concave recess 482 for engagement with a convex extension 483 of the nozzle tip.

In this embodiment, wherein a one to one connection is required, nozzle tip 418 is connected to the adapter as discussed earlier but the nozzle tip has only one channel 438 extending longitudinally through it. Since only one channel is connected to one sprue, force equalization is not an issue. In this case, the sprue 480 also has a concave recess 484 for engagement with another convex extension 485 of the nozzle tip.

Accordingly, nozzle tip 418 includes two convex extensions with a body portion therebetween, wherein the wall 486 of the body portion, adjacent adapter 416, is angled on each side of extension 483, from the extension away from the adapter. The angling of wall 486 allows for the pivotal movement of nozzle tip 418 relative to adapter 416 and sprue 480. Such pivoting between the interfaces facilitates alignment and the creation of a seal between the barrel (not shown) and sprue via the axial force pushing them together. Substantial misalignment can be tolerated, as shown in FIG. 9, by assuring via the design of nozzle tip 418, that the walls 486 and 487 of nozzle tip 418 are substantially distanced from the walls 488 and 490, respectively, of adapter 416 and sprue 480 to allow substantial pivoting.

Figure 10:
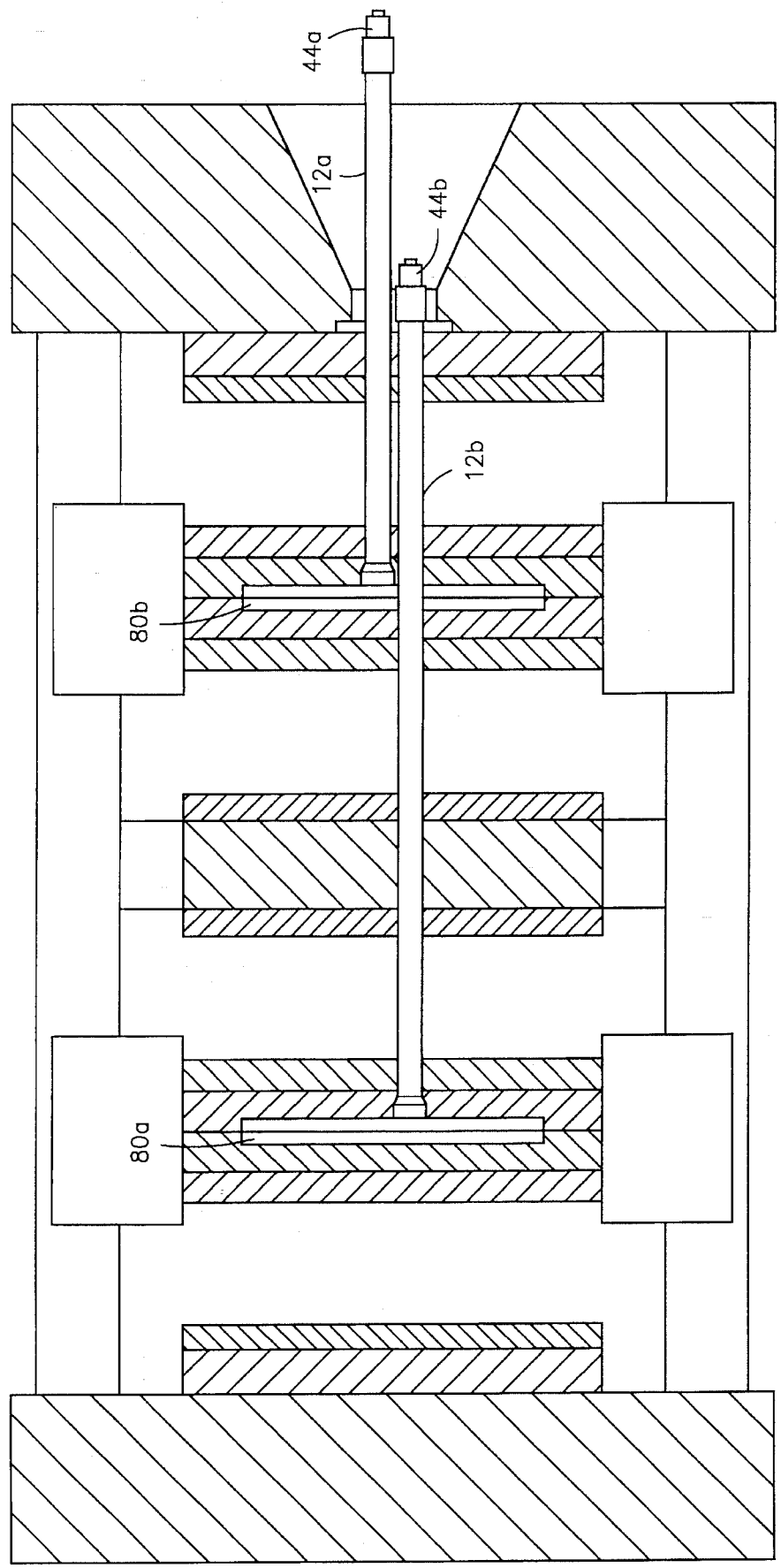
FIG. 10 is a top or plan view of a multi-level stack injection molder of FIG. 1 in the open position.

During the operation of the injection molder, referring to FIG. 10, and also FIG. 1, with each molding cycle, sprue bars 12a and 12b move with hot runners 80a and 80b. Due to the length of sprue bars 12a and 12b and normal mechanical variations, sprue bushings 44a and 44b tend not to return to the exact same location each time the injection mold is closed. Unlike the prior art, where systems allow very little variation in the return positioning of the sprue bushings to function properly, and require extremely precise manufacturing of the components comprising the system including the sprue bars, sprue bushings and nozzle tips, the instant device is return position error tolerant and does not require precision manufacturing. In some devices of the prior art, if one of the sprue bushings contacts a nozzle tip prior to another, then the other sprue bushing would not be exposed to the same sealing force since the extruder would compress one sprue before the other sprue contacted the nozzle. The effectiveness of the seal between a bushing and nozzle is dependent upon the force urging them together. Too much force at this interface may damage the spherical surfaces whereas to little force may fail to create an effective seal resulting in leakage or a dangerous spray of plastic.

Accordingly, in operation, the instant invention compensates for these variations and distributes the forces exerted by the injection unit to the sprue bars in a desired manner, as shown earlier in FIG. 2a. Therefore, none of the parts comprising the instant invention have to be manufactured to high precision. Referring to FIGS. 1, 2 and 8, the pair of cooperating spherical surfaces, recess 30 and extension 32 of adapter 16 and nozzle tip 18, respectively, slide on each other to allow nozzle tip 18 to pivot until all pairs of cooperating spherical surfaces are in contact before any significant force is exerted by the injection unit carriage on the sprue bars. Once all pairs of surfaces are seated, i.e., sprue bushings 44a and 44b with recesses 42a and 42b, respectively, forces of the injection carriage will be distributed as described in FIG. 2a.

Figure 11:
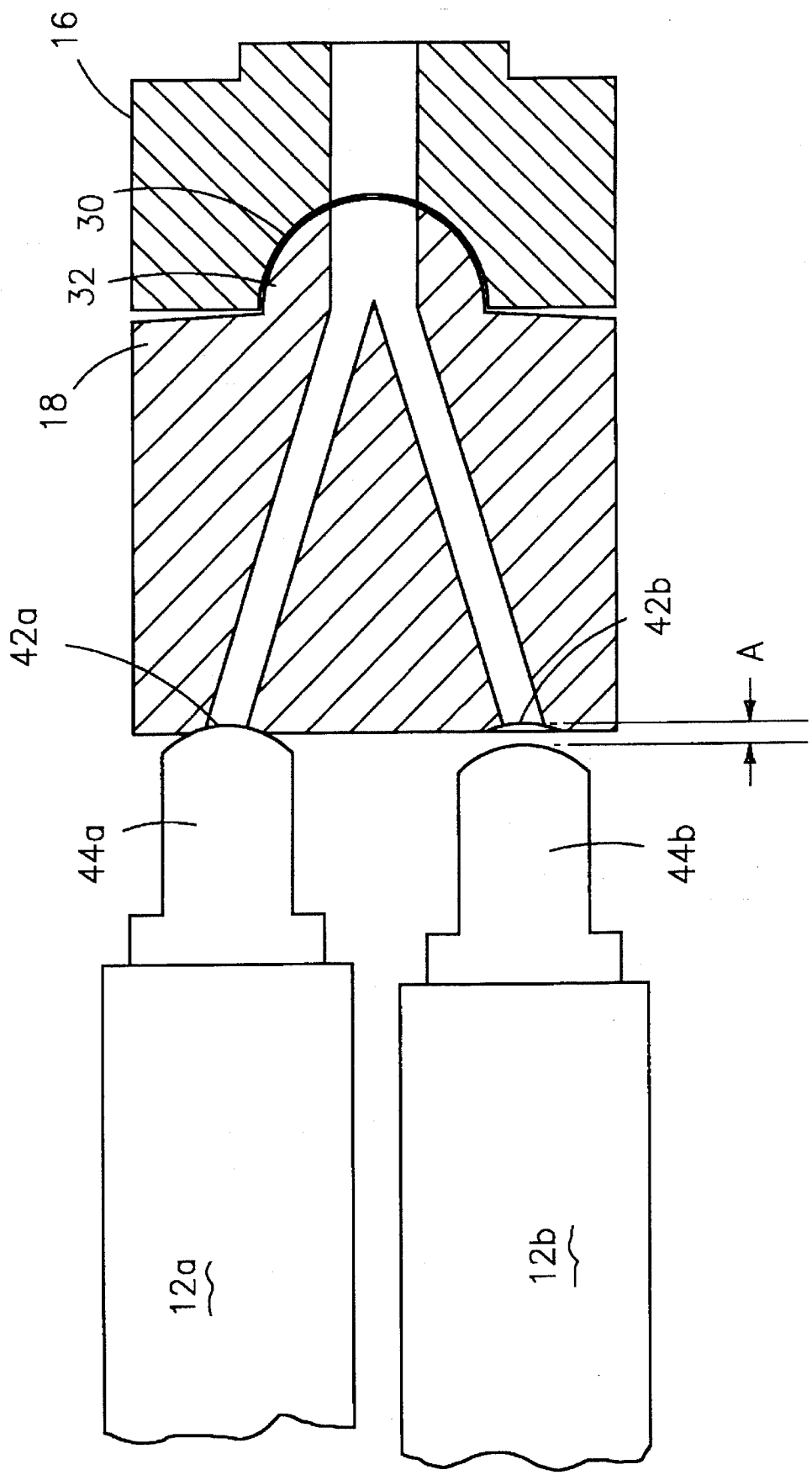
FIG. 11 is a top or plan view similar to FIG. 3 showing the nozzle of the present invention adjusting for the non-simultaneous return of the sprue bars.

FIG. 11 illustrates an extreme case for the FIG. 1 embodiment where sprue bushings 44a and 44b are positioned at substantially different longitudinal positions upon return to the nozzle tip. This difference is shown as distance A. Accordingly, sprue bush 44a is in contact with its cooperating concave surface of recess 42a and sprue bush 44b is a distance A from contacting the concave spherical surface of its respective recess 42b. As the injection unit and sprue bars are moved toward each other, sprue bar 12a and sprue bush 44a push on the concave spherical surface of recess 42a causing nozzle tip 18 to pivot in the area of engagement between spherical extension 32 of nozzle tip 18 and spherical recess 30 of adapter 16. As a result, sprue bush 44a is caused to slide on and pivot with recess 42a resulting in concave recess 42b moving toward sprue bush 44b until they contact as shown in FIG. 2. This nozzle arrangement will function as described whether the injection unit moves toward the sprue bars or if the sprue bars are moved toward the nozzle and injection unit. The description of the operation for nozzle 10 is equally applicable to nozzle 110 and nozzles 210.

The primary advantage of this invention is that an injector nozzle is provided for use with at least one sprue which distributes a sealing force in a desired manner among at least one or a plurality of sprues and allows for return positioning error. Another advantage is that an injector nozzle is provided for use with at least one sprue which does not require precision manufacturing yet still tolerates substantial misalignment. Still another advantage is that an injector nozzle is provided for use with at least one sprue which requires no modifications to the existing injection molding machines for using the nozzle. Yet another advantage of this invention is that an injector nozzle is provided for use with multiple sprue bars which is tolerant of wear of mating spherical surfaces. And still another advantage of this invention is that an injector nozzle for use with multiple sprue bars is provided which can be used in stacked formations to service injection molding machines having almost any number of channels. And still another advantage of this invention is that an injector nozzle is provided for use with multiple sprue bars having a simple mechanical operation for insuring equal force distribution to multiple sprue bar arrangements while also assuring uniform sealing forces.

It is apparent that there has been provided in accordance with this invention, an injector nozzle which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A nozzle for directing molding material from a material source to at least one sprue, comprising:
   a first surface adapted to be positioned adjacent to and pivotally movable relative to the material source and in material communication with the material source;
   a second surface adapted to be positioned in contact with and pivotally movable relative to the sprue, wherein the second surface is in material flow communication with the first surface and is adapted to be in material flow communication with the sprue and wherein the second surface is adapted to create a first seal via contact with the sprue prior to the introduction of the molding material and pressure increases associated with said introduction of the molding material; and
   channel means for establishing the material flow communication through the nozzle.

2. The nozzle according to claim 1, further including means for connecting the nozzle with the material source, wherein the first surface engages the means for connecting.

3. The nozzle according to claim 2, wherein the means for connecting is comprised of an adapter adapted to be sealably connected to the material source, the adapter having an engaging surface in pivotal engagement with the first surface and having the channel means passing therethrough, wherein a second seal is created between the engaging surface and the first surface.

4. The nozzle according to claim 3, wherein the first and second surfaces comprise sides of a first nozzle tip which directs the material from the adapter to the sprue, wherein the second surface includes an area adapted to be pivotally and sealably engaged with the sprue.

5. The nozzle according to claim 4, including at least two of said sprues, wherein the second surface includes at least two areas each adapted to pivotally and sealably engage a respective one of said sprues, and wherein the channel means comprises a first channel passing through the adapter, a second channel entering the nozzle tip from the first surface and third and fourth channels extending from the second channel toward the second surface, wherein each of the third and fourth channels are adapted to be in material flow communication with a sprue.

6. The nozzle system according to claim 3, including at least two of said sprues, wherein the second surface includes a plurality of areas each adapted to pivotally and sealably engage a respective one of said sprues.

7. The nozzle according to claim 6, wherein the areas are substantially concave indents.

8. The nozzle according to claim 3, wherein the engaging surface is comprised of an indent and the first surface comprises an extension which pivotally engages the indent.

9. The nozzle according to claim 8, wherein the indent of the engaging surface is concave and the extension of the first surface is convex such that the convex extension pivotally and sealably mates with the concave indent.

10. The nozzle according to claim 9, wherein the convex extension has a depth greater than the depth of the concave engaging surface.

11. The nozzle according to claim 7, wherein the concave indents of the second surface are adapted to pivotally and sealably mate with a respective one of said sprues, wherein the sprues are convex sprue bushings connected to a sprue bar.

12. The nozzle according to claim 4, further including means for resiliently connecting the nozzle tip to the adapter such that the nozzle tip returns into substantially axial alignment with the adapter after pivoting.

13. The nozzle according to claim 12, wherein the means for connecting comprises a plurality of spring loaded fasteners positioned between the nozzle tip and the adapter.

14. The nozzle according to claim 4, further comprising two secondary nozzle tips having first and second sides, the secondary nozzle tips positioned adjacent the second surface of the first nozzle tip, wherein the secondary nozzle tips are each adapted to direct molding material to at least two sprues and each secondary nozzle tip includes an area on the first side which is pivotally and sealably engaged with the first nozzle tip.

15. The nozzle according to claim 14, wherein the second sides of each of the secondary nozzle tips each include two areas each adapted to be pivotally and sealably engaged with a respective one of said sprues.

16. The nozzle according to claim 15, wherein each area on each first side is a convex extension and each area on each second side is a concave recess.

17. The nozzle according to claim 4, wherein the second surface includes three areas arranged in a substantially triangular pattern.

18. The nozzle according to claim 17, including at least three of said sprees, wherein each of the three areas has a concave indent each adapted to engage a respective one of said sprues.

19. The nozzle according to claim 4, further comprising two secondary nozzle tips having first and second sides, the secondary nozzle tips positioned adjacent the second surface of the fist nozzle tip, wherein the secondary nozzle tips are each adapted to direct molding material to a respective one of said sprues and each secondary nozzle tip includes an area on the first side which is pivotally and sealably engaged with the first nozzle tip.

20. The nozzle according to claim 19, including at least two of said sprues, wherein the second sides of each of the secondary nozzle tips each include an area adapted to be pivotally and sealably engaged with a respective one of said sprues.

21. The nozzle according to claim 20, wherein each area on each first side is a convex extension and each area on each second side is a concave recess.

22. The nozzle according to claim 1, wherein each of the first and second surfaces includes a convex extension.

23. The nozzle according to claim 22, wherein the channel means extends through each of the convex extensions.

24. The nozzle according to claim 22, further including means for connecting the nozzle with the material source, wherein the convex extension of the first surface engages the means for connecting.

25. The nozzle according to claim 24, wherein the means for connecting is comprised of an adapter adapted to be sealably connected to the material source, the adapter having an engaging surface in pivotal engagement with the first surface and having the channel means passing therethrough, wherein a second seal is created between the engaging surface and the first surface.

26. The nozzle according to claim 24, wherein a portion of the first surface is angled away from the means for connecting.

* * * * *